May 24, 1966 O. C. BLOMGREN, SR., ETAL 3,252,689
METHOD AND APPARATUS FOR MIXING AND DISTRIBUTING LIQUIDS
Filed June 10, 1964 7 Sheets-Sheet 1

INVENTORS
OSCAR C. BLOMGREN, SR.
BY OSCAR C. BLOMGREN, JR.
Dick M. Warburton
Attorney May 24, 1966   O. C. BLOMGREN, SR., ET AL   3,252,689
METHOD AND APPARATUS FOR MIXING AND DISTRIBUTING LIQUIDS
Filed June 10, 1964   7 Sheets-Sheet 3

INVENTORS
OSCAR C. BLOMGREN, SR.
OSCAR C. BLOMGREN, JR.

BY Dick M. Warburton
ATTORNEY

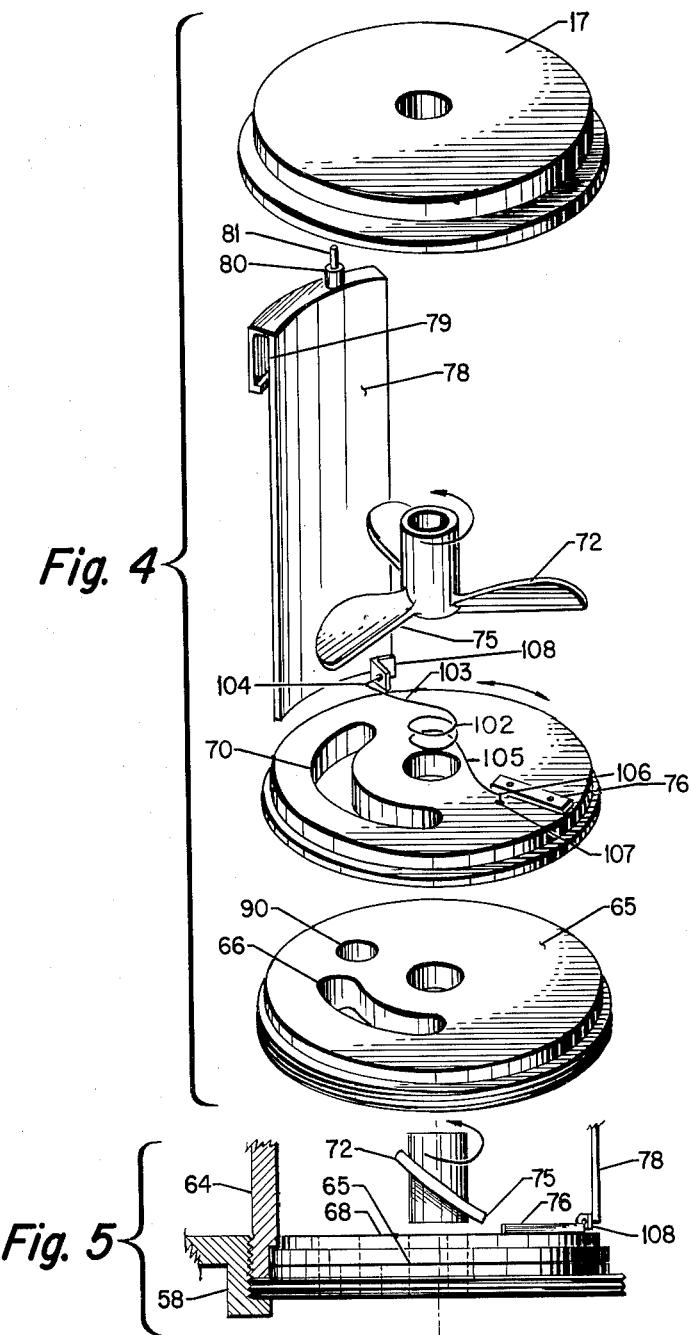

May 24, 1966    O. C. BLOMGREN, SR., ET AL    3,252,689
METHOD AND APPARATUS FOR MIXING AND DISTRIBUTING LIQUIDS
Filed June 10, 1964      7 Sheets-Sheet 6

INVENTORS
OSCAR C. BLOMGREN, SR.
OSCAR C. BLOMGREN, JR.

BY *Dick M. Warburton*
ATTORNEY

INVENTORS
OSCAR C. BLOMGREN, SR.
OSCAR C. BLOMGREN, JR.

BY Dick M. Warburton
ATTORNEY

United States Patent Office 3,252,689
Patented May 24, 1966

3,252,689
METHOD AND APPARATUS FOR MIXING AND DISTRIBUTING LIQUIDS
Oscar C. Blomgren, Sr., and Oscar C. Blomgren, Jr., both of Lake Bluff, Ill., assignors to Diamond Alkali Company, Cleveland, Ohio, a corporation of Delaware
Filed June 10, 1964, Ser. No. 374,057
25 Claims. (Cl. 259—8)

This invention relates to a liquid mixing and distributing device and, more particularly, to a device for receiving at least one liquid phase to be mixed with another material, which material may also be a liquid, and mixing the same to produce a dispersion, solution, or emulsion, as the case may be, and thereafter to distribute the resulting mixture as a spray of variable particle size and variable shape as to vertical and horizontal cross-section.

Priorly, numerous devices have been employed to distribute a spray of a given material such as a plant toxicant over a given area. One type of device which has been employed is a spray apparatus employing a premixed emulsion. This arrangement, however, presents certain disadvantages. For example, the toxicant must be previously mixed with water or other vehicle and this involves additional expense when shipping the material. If the material such as oil and toxicant is shipped without being mixed with water, then it must be mixed with water prior to being employed in this type of sprayer. This mixing operation involves additional handling. Further, these prior art devices which employ a premixed or pre-emulsified emulsion contain no provision for varying the viscosity of the emulsion. Yet another problem involved in employing a pre-mixed emulsion is that of controlling the dispersion of the emulsion such that it will not drift in the wind when it is sprayed.

While the above problems might appear to suggest a solution in the form of an in-transit mixing apparatus or an intransit emulsification process, this avenue presents additional problems. For example, it is necessary to control accurately the viscosity of the emulsion during the mixing and spraying operation. This is a relatively complex problem because the viscosity of a water-in-oil, or invert emulsion, rapidly varies in accordance with the amounts of the respective ingredients being supplied to the emulsion. Further, numerous attempts have been made to mix or emulsify liquids in-transit, but the apparatus employed may frequently become clogged due to the high viscosity of the mixture of components. Still another problem of an in-transit emulsifying apparatus is that of continuously initiating seeding of an invert emulsion and holding this initial mixture in an inverted phase relationship. Seeding is the emulsification or dispersion of a portion of the water phase in the oil. Yet another problem of this type of apparatus is that of controlling the particle size of an invert emulsion while spraying the particles over a relatively wide area because the rate at which the spray is discharged determines the maximum longitudinal dimension of the particles of the emulsion which, with variations in the viscosity, will cause variations in the diameter of the ultimate particles obtained.

Accordingly, it is an object of this invention to provide an improved liquid mixing device and method therefor.

It is another object of this invention to provide an improved liquid mixing and distributing device which obviates the above-mentioned disadvantages and constitutes a solution of the above-mentioned problems.

Still another object of this invention is to provide an improved continuous liquid mixing device which discharges a variable viscosity fluid, the viscosity of which may be accurately and closely controlled.

It is a further object of this invention to provide an in-transit mixing and distributing device which is simple in construction, will not clog and will provide a mixture, or emulsion, the viscosity of which may be closely and accurately controlled.

It is a still further object of this invention to provide a liquid mixing apparatus and method therefor in which the emulsion is seeded and held in an inverted stage, or phase.

It is yet another object of this invention to provide an improved liquid mixing and distributing device which promotes uniformity of the particle size of the particles distributed from the device.

Yet a further object of this invention is to provide a liquid mixing and distributing device with coarse and fine controls for accurately controlling the viscosity of the fluid distributed.

Briefly, in accordance with the principal aspects of this invention, we have discovered that a continuous mixing operation can be performed in a mixing device into which two or more liquids are fed, one of which is to be emulsified or mixed in the other, if the mixing fluids are fed to the bottom or lower portion of a mixing chamber and are drawn into the mixing chamber by an intake propeller or impeller mounted on a rotating shaft and the propeller shaft is provided with a second propeller mounted above the intake propeller, which second propeller is mounted to propel fluid in the reverse direction, i.e., toward the intake propeller. By introducing the liquids to the lower portion of the mixing chamber, the inrushing fluid produces a "flushing" action and clogging is prevented. By employing an intake propeller, the movement of the fluid coming into the mixing chamber is increased to further reduce the clogging. The combination of the opposing pitched propellers causes increased agitation and shearing of the fluids to rapidly initiate or "seed" an emulsifying action.

In accordance with other important aspects of this invention, we employ in a continuous mixing apparatus a mixing chamber, a pair of inlet ports communicating with the lower portion of the mixing chamber, a first propeller rotatably mounted adjacent the inlet ports, a second propeller mounted above the first propeller and having its blades pitched in the opposite direction from the first propeller and viscosity control means including a variable intake port for controlling the amount of at least one of the fluids introduced into the mixing chamber and means responsive to the viscosity of the mixture in the chamber for controlling the opening of the variable port accurately to control the viscosity of the fluid in the mixing chamber.

In accordance with more specific aspects of this invention, we employ in a continuous mixing apparatus a variable viscosity control means including a variable cross-sectional area inlet port communicating with the lower portion of the mixing chamber, a shaft rotatably mounted and projecting into the chamber, a first propeller rotatably mounted on the shaft and positioned adjacent the inlet ports, the variable inlet port including a disc valve rotatably mounted in the mixing chamber, a second propeller mounted above the first propeller on the propeller shaft and variable viscosity control means including a baffle member mounted on the disc valve and positioned adjacent the path of the first propeller, spring means normally biasing the disc valve in a first position and means for adjusting the tension of said spring means thereby controlling the quiescent position of the disc valve which in turn varies the viscosity of the mixture in the mixing chamber.

In accordance with still more specific aspects of this invention, we employ, in a cylindrical mixing chamber which is inclosed at the bottom and open at the top, a movable plate positioned adjacent a pair of intake ports for controlling the cross-sectional area of at least one of the intake ports, a rotatably mounted shaft positioned in said mixing chamber, a first blade mounted on said shaft adjacent the intake ports, a second blade mounted above the first blade with its blade pitched in the direction opposite to the first blade, a third blade positioned above the second blade for discharging the mixed fluids over the top of the mixing chamber and means cooperating with the first blade and with the movable plate for controlling the effective cross-sectional area of the inlet port accurately to control the viscosity of the fluid in the mixing chamber.

In accordance with other more specific aspects of this invention, we position a cylindrical mixing chamber within a fluid-tight housing, supply water, an oil, and an emulsifier to the interior of the mixing chamber, mix the liquids in the chamber to seed or initiate emulsification, pump the mixture from the mixing chamber into the fluid or mixing chamber housing, add a controllable amount of one of the phases to the mixture from the chamber, further mix the modified mixture and propel it through discharge ports. Advantageously, means are provided for varying the cross-sectional area of these discharge ports to thereby control the particle size of the emulsion dispensed from the outlet ports. Also advantageously, the shaft means to which the mixing impellers are connected extends through the mixing chamber and connects in driving relationship with the agitator and impeller in the distributor housing and a suitable motor is mounted on the mixing chamber housing and coupled to the rotatably mounted shaft in driving relationship.

These and various other objects and features of this invention will be more clearly understood from a reading of the detailed description of the invention in conjunction with the drawings in which:

FIGURE 4 is an exploded view of the viscosity sensing components of the present invention in conjunction with the valve for controlling the flow of water into the mixing chamber;

FIGURE 5 is a detail fragmentary side elevational view of the viscosity sensing components of the device;

Figure 1:
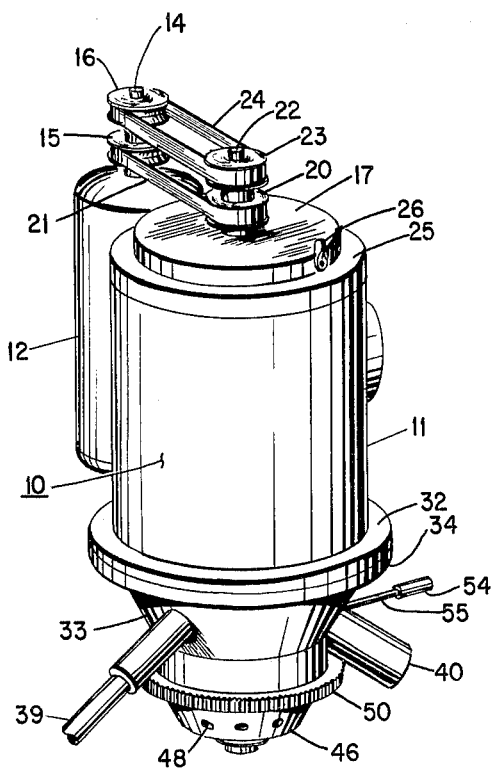
FIGURE 1 is a perspective view of one illustrative embodiment of mixing and spraying device according to the present invention.
Figure 2:
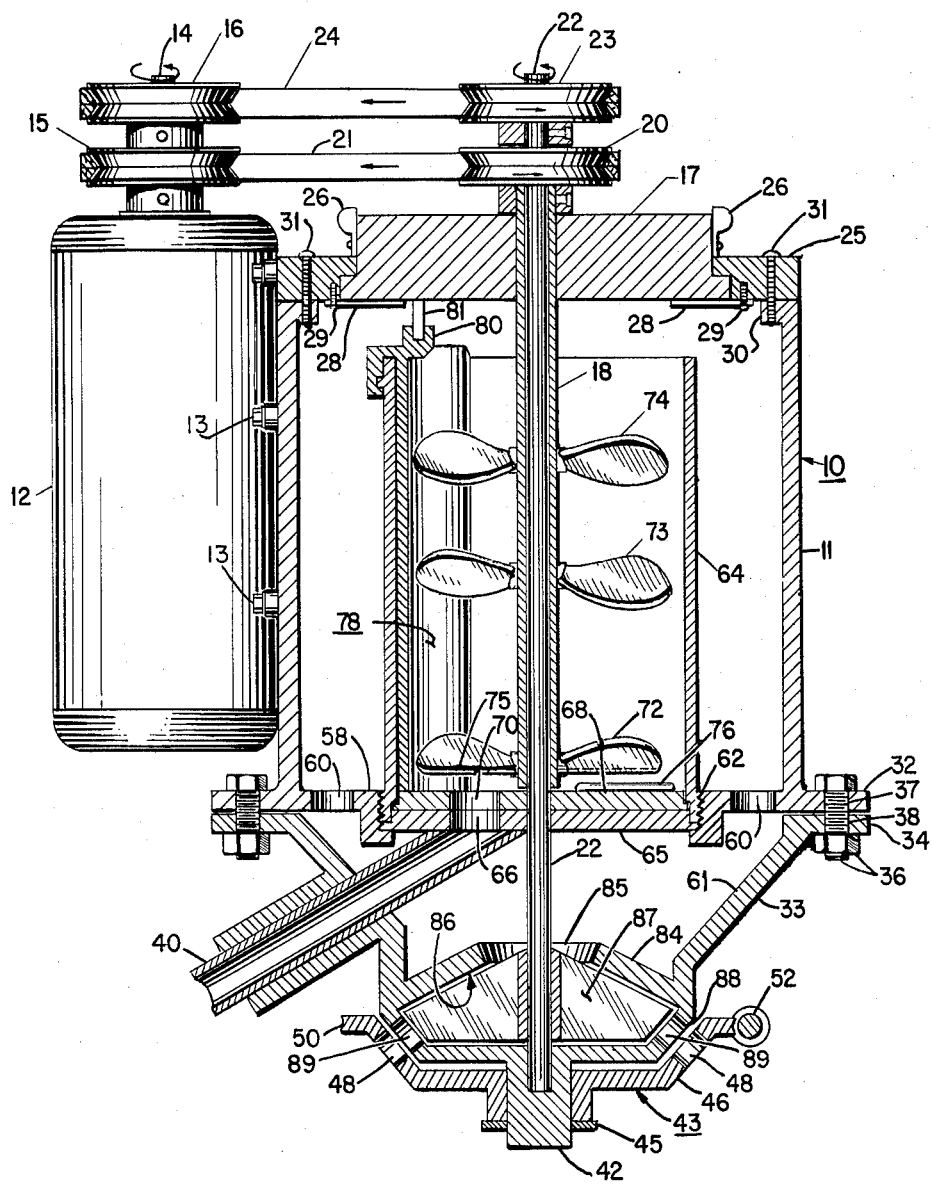
FIGURE 2 is a partial vertical section of the device of FIGURE 1 with some parts shown in elevation, wherein the vertical section is taken through the mixing chamber and distributor of the device.

Referring now to FIGURES 1 and 2 which are perspective and elevational views in section, respectively, of one illustrative embodiment of a mixing and distributing device 10 according to this invention. The device 10 includes a housing 11, a motor 12 mounted on the housing 11 by suitable means such as by bolts 13, shown in FIGURE 2, and the motor connected in driving relationship with impellers on the interior of the housing 11 in a manner which will be subsequently described. The motor 12 is preferably an electric motor and includes a shaft 14 which is rotatably mounted in the motor 12 and has a pair of pulleys 15, 16 secured thereto. The housing 11 includes a top portion, or member, 17 in which a tubular shaft 18 is rotatably mounted. A pulley 20 is secured to the shaft 18 and the pulley 20 is coupled in driven relationship to the pulley 15 by means of a suitable belt 21. A shaft 22 is rotatably mounted within the tubular shaft 18 and has a pulley 23 secured thereto, which pulley is driven through pulley 16 by means of a belt 24. The top portion 17 of the housing 11 is rotatably mounted in an annular flange 25 and may be secured in any position of relative rotation by means of a pair of tabs or locks 26. The purpose of this rotatable relationship of top portion 17 is to control the setting of the variable viscosity control means in a manner which will be subsequently described. The top member 17 is supported in the annular flange 25 by means of radially projecting fingers 28 which are supported by suitable screws 29 on the lower surface of the annular flange 25. The annular flange 25 is secured to an inturned annular flange 30, formed integrally with the cylindrical portion of housing 11 by means of threaded bolts 31.

The lower portion of the housing 11 terminates in an outwardly extending radial flange 32 and a distributor housing 33 is secured to this flange 32 by means of a mating flange 34 and a plurality of nut and bolt devices 36 extending through suitable aligned apertures 37, 38 in flanges 32, 34, respectively. A suitable gasket seal, not shown, is preferably provided between these mating flanges. Radially projecting through the distributor housing 33 is a pair of inlet pipe means 39 and 40 for separately introducing the aqueous and oil phases into the mixer housing 11. Inlet pipe 40 is preferably larger in diameter than the pipe 39 for delivering a greater volume of one of the constituents to the mixing chamber housing 11. The bottom of the distributor housing 33 terminates in a cylindrical bearing support 42 on which is rotatably mounted a generally frusto-conical plate 43 which is retained on support 42 by a suitable retaining ring 45. The plate 43 includes an inclined surface 46 having a plurality of circumferentially spaced apertures 48 of circular cross-section. The outermost portion of the inclined surface 46 is integrally connected to a circular gear arrangement 50. Circular gear 50 may be rotated by a worm wheel 52 on which is connected a handle 54 by means of a shaft 55 to control the effective cross-sectional area of the discharge ports in a manner to be described.

As best seen in FIGURE 2, the lower portion of the housing 11 terminates in an integral plate 58 which has a plurality of apertures 60 therein. The inner portion of the plate 58 terminates in a cylindrical ring which is threaded at 62 to receive a right circular cylinder mixing chamber 64. The plate 58 also receives a suitably threaded plate 65 which defines the bottom for the mixing chamber 64 and the circular plate 65 has an elliptical fluid passage 66 therein. The fluid passage 66 communicates with the fluid inlet pipe 40 to permit the entry of fluid from the pipe 40 into the mixing chamber 64. In the bottom of the mixing chamber 64 is a circular plate 68 which is rotatably mounted and includes an elongated elliptical fluid passage 70 therein which may be aligned with the passage 66 in the bottom plate 65 to permit the admission of fluid from the pipe 40. This plate 68 is a portion of the viscosity control means and may be positioned relative to the inlet passage 66 to control the effective cross-sectional area of passage 66 and thus control the viscosity of the fluid in the mixing chamber 64 by limiting the flow rate of one of the mixture constituents in a manner which will be subsequently described.

A group of three impellers 72, 73 and 74 is secured to the tubular shaft 18. The first impeller, or propeller, 72 is mounted at the bottom of the shaft 18 and rotates in close proximity to the aperture 70 in the valve plate 68.

Advantageously, the impeller 72 has a pitch which causes the impeller 72 to draw the fluids in through the intake pipes, such as pipes 39 and 40, and the lower portion of the blade 72 terminates in a straight baffle surface 75 for creating fluid friction. The second propeller, or impeller, 73 is mounted intermediate the mixing chamber 64 and preferably has a pitch in a direction opposite to that of impeller 72 so that the impeller 73 constitutes a means for moving the fluid in the mixing chamber 64 in a direction toward the impeller 72 to thus increase the shearing and mixing action within the chamber 64. The third propeller, or impeller, 74 has a pitch in the same direction as that of impeller 72 to lift or pump the mixed or thickened liquid from the chamber 64 over the top edge of chamber 64 and into the annular space between the mixing chamber 64 and the housing 11. Fluid pumped out of the mixing chamber 64 into the annular space between the chamber 64 and the housing 11 falls downwardly through the apertures 60 into a frusto-conical or funnel-like surface 61 defining the inner surface of the distributor housing 33. Further details of the fluid flow circuit will be described in conjunction with FIGURE 3.

For controlling viscosity, the valve plate 68 includes a baffle member 76 secured to the surface thereof in close proximity to the straight baffle surface 75 on the impeller 72 such that rotation of the impeller 72 in a liquid in the chamber 64 causes a shearing action between the straight baffle surface 75 and the baffle member 76. This shearing action produces a frictional force between the blade or impeller 72 and the baffle 76, which force is proportional to the viscosity of the fluid in the chamber 64. Thus, for a given rotational speed of impeller 72, the force on baffle 76, which tends to rotate the valve plate 68, will be proportional to the viscosity of the fluid and this force will tend to rotate the aperture 70 relative to the aperture 66 to thereby restrict the liquid passing from the conduit, or pipe, 40 into the chamber 64. The viscosity control means also includes a plate 78 which has an arcuate cross-section and is slidably mounted on the cylindrical mixing chamber 64 by means of an integral downturned lip 79 which extends over and slidably engages the circular chamber 64. The member 78 has a hollow cylindrical extension 80 which receives a cylindrical pin 81 integrally formed with the rotatable top portion 17 of the housing 11 so that rotation of the housing top portion 17 will produce a corresponding rotation of the arcuate plate 78. Advantageously, the plate 78 is coupled to the valve plate 68 by means of a spring, which will be subsequently shown and described, so that the rotation of the top member 17 increases or decreases the tension in the spring depending upon the direction of rotation. The tension of this spring determines the amount of force required to be developed against the frictional baffle 76 to produce an opening or closing movement of the valve plate 68, which relationship will be subsequently described in detail.

As previously mentioned, fluid passing over the mixing chamber 64 into the housing 11 falls through the apertures 60 and into the frusto-conical inner surface 61 of the housing 33. From there the fluid passes over a frusto-conical wall portion 84 and is drawn into an eye 85 of a centrifugal pump chamber 86 which incloses an impeller 87 secured to the driven shaft 22. Positioned around the periphery of the impeller chamber 86 on a frusto-conical surface 88 is a plurality of substantially cylindrical discharge ports 89 in the distributor housing 33. Preferably, these ports 89 are equally spaced around frusto-conical surface 88, which surface is directed downwardly to produce a good distributional pattern. One of the most serious problems in mixing fluids of relatively high viscosity is that of preventing clogging of the fluids in the mixing chamber. In accordance with an important feature of this invention, clogging is prevented by the novel arrangement of structure which produces a fluid flow which flushes the fluid through the mixing chamber to thus prevent clogging.

Figure 3:
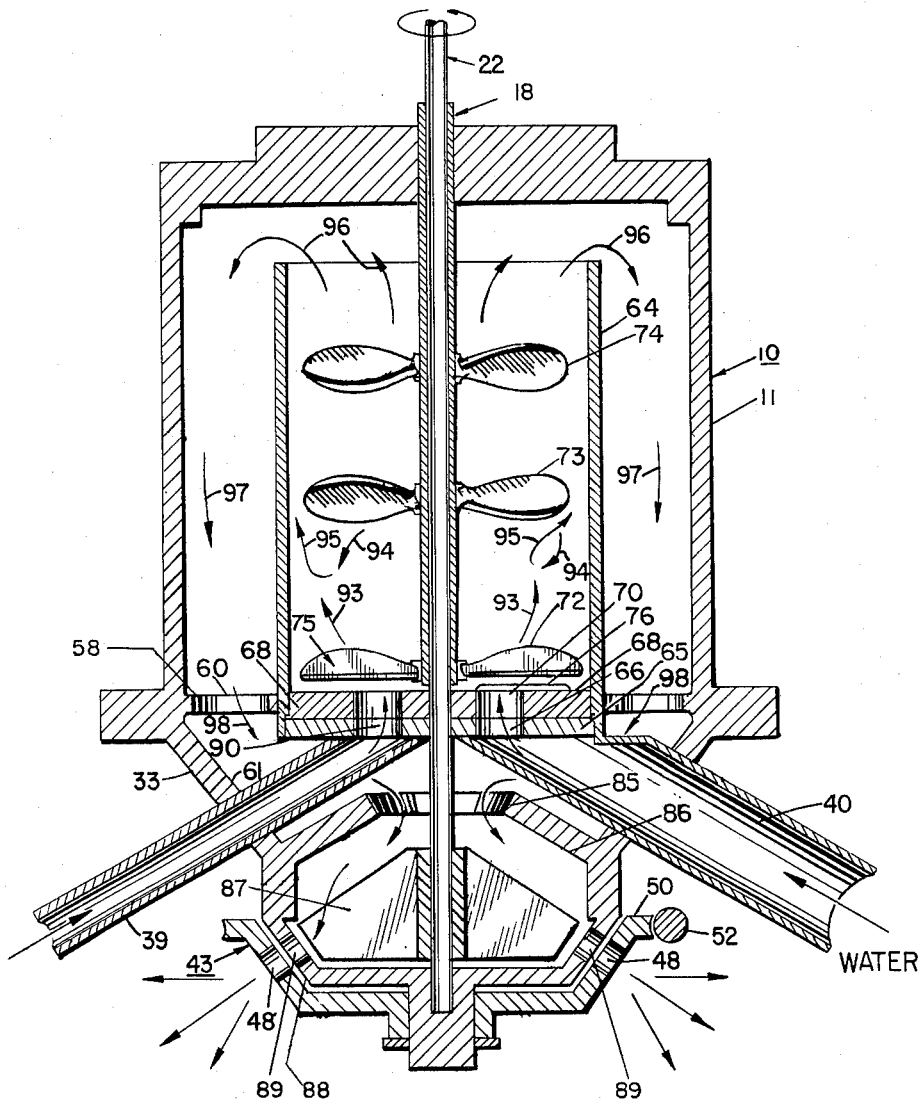
FIGURE 3 is a schematic vertical section taken through the longitudinal axis of the fluid-introducing conduits of FIGURES 1, 6 and 7, illustrating the flow pattern of the mixing and spraying components of the device of FIGURE 1.

The fluid flow is illustrated schematically in FIGURE 3. Certain portions of the structure such as the impeller 87 and pump chamber 86 have been accentuated and simplified merely for the purpose of illustrating the fluid flow. Arrows are employed to illustrate the direction of flow and, for the purposes of this explanation, it will be assumed that water is entering the intake pipe 40 and a fluid, such as oil, in which the water is to be emulsified is entering the intake pipe 39. Oil, which enters the pipe 39, passes through an aperture 90 in the bottom plate 65 and passes through the elongated aperture 70 in the valve plate 68. The water entering the pipe 40 enters the aperture 66 in the bottom member 65 and passes through the aperture 70 in the valve plate 68. In each instance, these fluids are drawn into the mixing chamber 64 by the rotation of the first impeller 72. As indicated by a pair of arrows 93 extending from the top of the impeller 72, the fluid is forced upwardly toward the second impeller 73. The arrows 94 immediately beneath the second impeller 73 indicate that this impeller is forcing the fluid downwardly toward the first impeller 72 to thus produce a high degree of agitation and shearing which effectively produces a seeding action of the emulsification of the water in the oil.

Because of the incompressibility of the fluids, an upward flow takes place, as indicated by arrows 95. The third impeller 74 effectively pumps the fluid from the mixing chamber 64 over the top of the cylindrical chamber, as indicated by a group of arrows 96 immediately above the impeller 74. The fluid which is pumped up from the mixing chamber 64 by the third impeller 74 falls downwardly toward the distributor 43, as indicated by the arrows 97, and this fluid passes into the distributor 43 as indicated by the arrows 98. The fluid then passes through the eye 85 of the impeller housing 86 and the impeller 87 projects this fluid radially and downwardly through the discharge ports 89 in distributor housing 33 and the discharge ports 48 in frusto-conical distributor plate 43.

FIGURE 4 is an exploded view of the means for controlling viscosity of the mixture in the mixing chamber 64. This means includes the rotatably mounted top member 17 which, as previously described, is rotatably mounted in plate 25 which in turn is fastened to the housing 11, the impeller 72 which is secured to the cylindrical shaft 18, the valve plate member 68 which is rotatably mounted on the shaft 22, the bottom member 65 of the mixing chamber 64 and the slidably mounted plate member 78. The control means further includes a spring 102 which is connected between the slidably mounted plate 78 and the rotatably mounted valve plate member 68, the baffle plate 76, an elongated aperture 70 in the valve plate member 68 and the inlet ports 66, 90 for water and oil, respectively. The spring 102 is substantially helical and encircles the shaft 22 and has an arm 103 which terminates in a right angle bend 104 which projects into a suitable aperture in a stopper not shown on the base of the arcuate plate 78. The opposite end of the helical spring 102 defines an arm 105 which terminates in a downwardly projecting right angle portion 106 which engages a suitable aperture 107 in the valve plate 68. By means of the spring connection of the spring 102 between the plate member 78 and the valve plate member 68, rotation of the top housing member 17 produces a corresponding rotation in the valve plate 68 to determine the quiescent position of the valve plate member 68 and thus determine the position of the elongated aperture 70, relative to the inlet ports 66, 90 in the bottom member 65. The elongated aperture 70 maintains the oil inlet port fully open but selectively controls the effective cross-sectional area of the water inlet port 66 in a manner which will be described in detail in conjunction with FIGURES 5 and 7.

The transfer of frictional forces generated by the baffle edge 75 upon rotation of the impeller 72 to the baffle plate 76 through the fluid controls the rotation of the valve plate member 68 and thus controls the relative movement of member 68 and the cross-sectional area of the water inlet port 66. This cooperation can best be understood with reference to FIGURE 5 which shows the positional relationship between the impeller 72 (blade away from viewer) and the valve plate member 68. In this view, however, the tolerance or clearance between the baffle edge 75 and the baffle plate 76 is exaggerated for clarity. In actual practice, this clearance is of the order of 0.001 inch and may be in the range of 0.005 to 0.020 inch, depending upon the viscosity of the fluids to be dispersed or mixed. As the fluid in the mixing chamber 64 increases in viscosity to a maximum value, the frictional force or shearing force between the baffle edge 75 and the baffle plate 76 increases proportionately with the fluid viscosity. This increasing shearing force or frictional force produces a counter-clockwise rotation of the valve plate member 68, as viewed in FIGURE 4, and a rotation of baffle plate from right to left as viewed in FIGURE 5. This rotation increases the effective cross-sectional area of the water inlet port 66 and thus causes the viscosity of the emulsion to be decreased. The rotation of the valve plate member 68 will, of course, continue in response to the shearing effect, or shearing force, until the spring tension of the spring 102 balances the shearing force effected by the fluids upon the baffle plate 76. A condition of equilibrium then prevails. If, however, the viscosity of the mixture in the chamber 64 decreases below a predetermined value such that the shearing force between the baffle edge 75 and the baffle plate 76 decreases, the spring 102 will exert a greater force upon the valve plate 68 than the shearing force and this unbalance of forces will cause the baffle, or valve plate, 68 to rotate in a clockwise direction, as viewed in FIGURE 4, and from left to right as viewed in FIGURE 5, to reduce the effective cross-sectional area of the water inlet port 66 which change in flow rate will tend to restore the predetermined viscosity. The shearing force will be a pulsating force which delivers a pulse to plate 76 each time a blade of impeller 72 passes plate 76. At high rotational speeds of impeller 72, however, oscillation of plate 68 is of relatively short amplitude.

Figure 7:
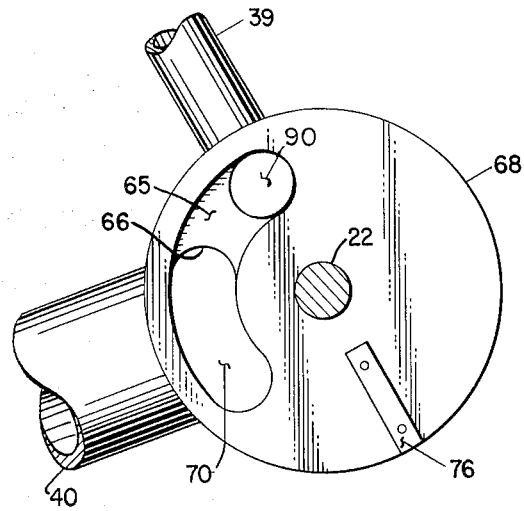
FIGURE 7 is a plan view similar to FIGURE 6 but showing the water control valve of FIGURE 6 in open position.
Figure 6:
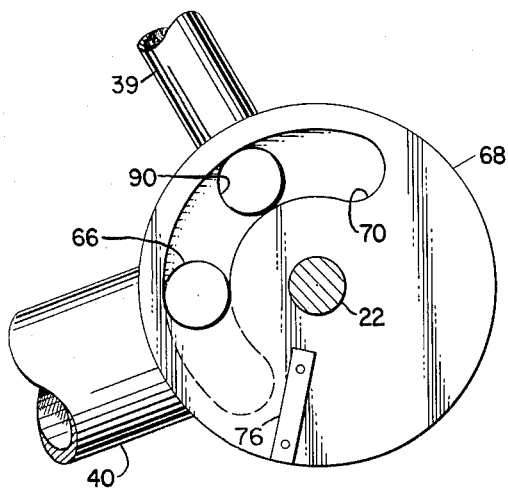
FIGURE 6 is a plan view of the valve for controlling the flow of water and showing it in less than fully open position.
Figure 8:
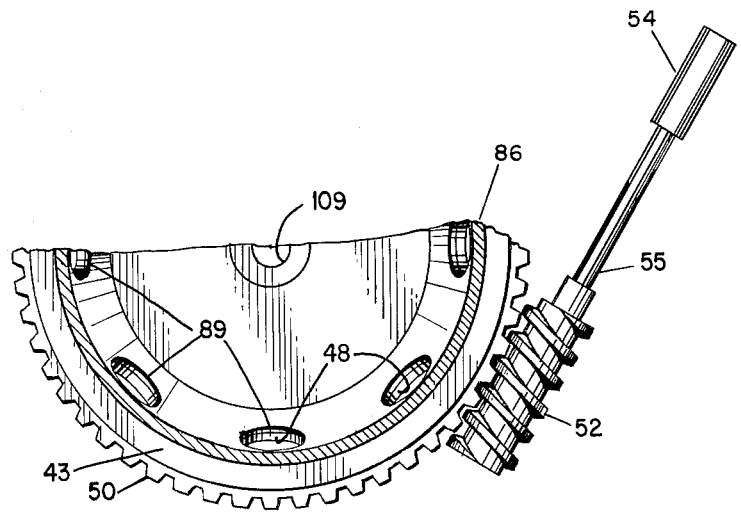
FIGURE 8 is a plan view of one form of distributor associated with the impeller of a centrifugal pump and showing the outlet control.
Figure 9:
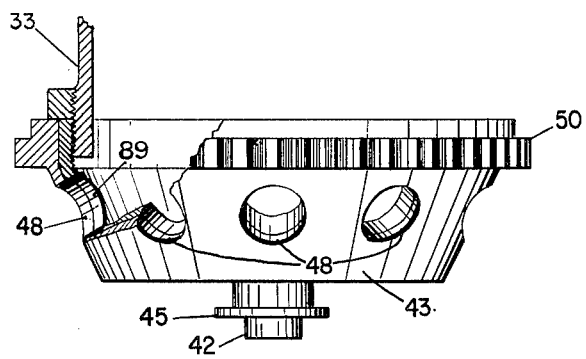
FIGURE 9 is a side elevation of the distributor of FIGURE 8 with portions broken away for purposes of clarity.
Figure 10:
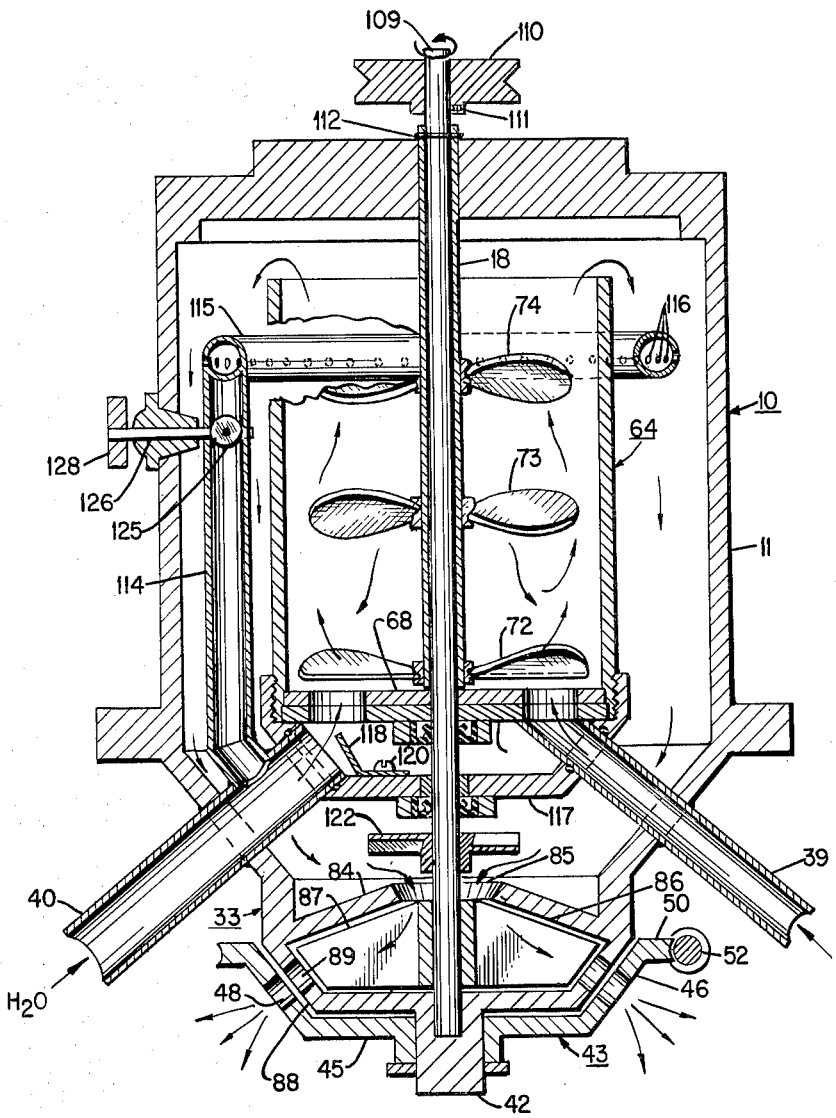
FIGURE 10 is a schematic view in elevation and in section of a preferred embodiment of the invention.

The valving action of the valve plate 68 can best be understood with reference to FIGURES 6 and 7 of the drawing which are plan views of the valve plate showing the valve plate in a partially closed and a fully open position, respectively. FIGURE 6 shows the valve plate 68 in a position such that the effective cross-sectional area of the water inlet port 66 is substantially circular, the dotted line portion of the port 66 being covered by the valve plate 68. The oil inlet port 90, however, is fully open and remains fully open throughout the operation of the device. It is assumed for the purposes of this explanation that the valve plate 68 is normally maintained in the position shown in FIGURE 6 by means of the spring 102 through the setting of the rotary table top portion 17 of housing 11. It is also assumed that there is no fluid in the mixing chamber 64 or that the impellers such as impeller 72 are not being rotated. Assuming now that fluid is introduced through the ports 66, 90 and that the impeller 72 is rotated, the frictional or shearing force between the straight baffle edge 75 of each blade of the impeller 72 and the baffle plate 76 applies a rotational force to the plate 68 to rotate it into position shown in FIGURE 7, which rotational force is proportional to the viscosity of the mixture as previously explained.

As shown in FIGURE 7, the elongated aperture 70 is now in registry with the outer edges of the water inlet port 66 and the effective cross-sectional area of port 66 is the same as the actual cross-sectional area and thus the water is being admitted to the mixing chamber in a ratio to the oil which is substantially equal to the ratios of the cross-sectional areas of the inlet ports 66 and 90. It is of course understood that the quiescent condition of the valve plate 68 can be adjusted between fully open and fully closed positions of the inlet port 66 by rotation of the top portion 17 of housing 11, depending upon the desired viscosity. It is also understood that for a given rotational speed of impeller 72, the actual viscosity of the mixture will be determined by the spring tension of the spring 102 and the viscosity of the fluid required to balance this spring tension with a frictional, or shearing, force upon the baffle plate 76. Thus, the ranges of viscosity can be changed by substituting springs 102 having different cross-sectional areas. In addition to controlling the viscosity of the fluid, it is important to control the size of the droplets discharged by the distributor in order to prevent undesirable drift of the liquid after it is discharged from the distributor. This problem of drift is solved by discharging droplets of closely controlled size of cross-sectional area, which droplets are relatively large, being of the order of one-eighth to three-fourths of an inch in cross-sectional diameter. With large droplets of this order of magnitude, drift is prevented and the spray will be confined to a relatively small area. The structure for controlling the size of the droplet is shown in detail in FIGURES 8 and 9.

FIGURE 8 is a fragmentary plan view and FIGURE 9 is an elevational view, partially broken away, of the structure employed to control the size of the droplets discharged by the distributor. FIGURE 8 is a plan view of the outer portion of the impeller chamber 86 and shows the radially spaced ports 89 in the frusto-conical surface 88. As shown in FIGURE 8, the center of the impeller housing 86 includes a cylindrical aperture 109 which receives the end of the shaft 22, as best seen in FIGURE 2. As shown in FIGURES 2 and 9, the outer plate 43 is rotatably mounted by means of a retaining ring 45 on the cylindrical bearing support 42 extending from the distributor housing 33. The frusto-conical plate 43 has a plurality of apertures 48 preferably having the same diameter as the apertures 89 in the periphery of the impeller housing 87 and these apertures 89 are equally spaced around the periphery of the plate 43 such that they can be in complete registry with the discharge port 89, as shown in FIGURES 8 and 9. Relative rotation between the plate 43 and the distributor housing 33 to control droplet lateral cross-sectional area is obtained by means of the cooperation of the gear 50 formed integrally with the periphery of the plate 43 and worm 52 which is rotatably mounted by suitable means, not shown, in a position to engage the gear 50, as best seen in FIGURE 8. FIGURE 8 also shows the shaft 55 which connects the worm 52 to the handle 54. It is, of course, understood that the longitudinal dimension of droplets issuing from the ports 48 will be determined in part by the velocity of rotation of the distributor impeller, or pump, 87. The lateral diameter of the droplets, however, will be determined by the degree of registry between the ports 48 and the ports 89. Once a rate of rotation has been selected by controlling the speed of the motor 12, the droplet size can be accurately controlled by rotating the worm 52 to restrict the effective cross-sectional area of the discharge ports 89. Because of the surface tension of the mixture fed from the mixing chamber 64, it is not essential that the apertures 89 and 48 be so positioned that the effective outlet port is circular. As soon as the droplets leave the distributor 33, surface tension will cause the droplets ultimately to assume a circular cross-section even though initially the droplets will be elongated due to the centrifugal force. As the effect of centrifugal force on the droplets diminishes, the droplets will assume a more spherical configuration.

FIGURE 10 is a schematic elevation, in section, of a preferred embodiment of this invention. As previously mentioned, like parts are designated with like reference numerals and the embodiment of FIGURE 10 contains the principal elements of the embodiment previously described in conjunction with FIGURES 1 through 9. The embodiment of FIGURE 10 exhibits a number of features in comparison to the previously described embodiment. The embodiment of FIGURE 10 is capable of "seeding" an invert emulsion and holding the emulsion in an inverted state. This is accomplished by supplying only part of the water and oil, producing a rapid shearing action by the aid of the propellers 72, 73 and 74, adding water to the stream of the seeded emulsion from the mixing chamber exteriorly of the mixing chamber, and closely controlling added water. Further mixing is obtained by subsequent agitation of the added water and the invert emulsion. This further agitation produces a uniform mixture, accelerates the liquid flow and prevents clogging of the mix. This embodiment includes the previously described automatic viscosity control means; however, only the movable valve plate 68 is shown. Further, in this embodiment, only a single propeller shaft 109 is employed and, accordingly, only a single pulley 110 is required, which pulley is secured to the shaft 109 by means of a threadably engaging locking pin 111. The propeller driving shaft 18 is secured to shaft 109 by pin 112 so as to cause rotation of propellers 72, 73, and 74. The means for adding water exteriorly of the mixing chamber 64 includes a conduit 114 communicating with the water inlet pipe 40 immediately exteriorly of the distributor housing 33, which conduit communicates with an annular ring-shaped conduit 115 encircling mixing chamber 64 and having a plurality of preferably equally spaced apertures 116 around its periphery. Inlet pipe 40 terminates in a chamber defining member 117 which threadably engages chamber 64. A baffle plate 118 is mounted within the member 117 and positioned transversely of the direction of flow of the fluid from the pipe 40 such that sufficient pressure is developed in the pipe 40 to deliver water up through the conduit 114 to the apertures 116. Baffle plate 118 is secured in position by any suitable means such as by a screw 120. The means for agitating the mixture which has been discharged from the mixing chamber 64 and has received added water from the discharge apertures 116 includes an agitator blade 122 secured to the shaft 109 below the mixing chamber 64 for agitating the modified invert emulsion and having a suitable pitch for forcing the emulsion downwardly. This embodiment includes a means for accurately controlling the amount of water added in the housing 11 exteriorly of the mixing chamber 64. In this particular embodiment, this means includes a butterfly valve 125 positioned in the conduit 114 and connected by means of a shaft 126 rotatably mounted in the housing 11 to a knob 128. By rotating the knob 128, accurate control of the positioning of the butterfly valve 125 is obtained. Thus, in this embodiment, a portion of the water, or liquid, is added to the mixing chamber 64 from the chamber 117 and vigorously agitated with oil to seed or initiate the emulsification, and the viscosity of the emulsion within the chamber is controlled by the previously described viscosity control means. After the emulsion is pumped from the chamber 64, a controlled amount of water is added from conduit 115 and agitated by agitator 122 and also delivered to the pump chamber 86, from which it is pumped by centrifugal pump 87 through the variable area discharge ports 89, 48.

Other types of distributors may be employed with either of these two embodiments. For example, the combination pump and distributor disclosed in our co-pending application, Serial No. 357,058, filed June 10, 1964, may be employed.

The invention is especially useful in those situations which require application or distribution in the form of a spray of relatively large volumes of liquid within a relatively short period of time and is especially useful in the spray application of non-Newtonian fluids which may take the form of water-in-oil emulsions having an almost jelly-like consistency, or those having thixotropic properties. Further, this invention is especially adapted for a mixing and spraying of the components of such fluids and emulsions from land borne vehicles, sea borne vehicles, or airborne vehicles of the ordinary fixed-wing type, or of the helicopter type, for the treatment or eradication of vegetation growing on the earth's surface. The advantages in this latter type of application, in employing the device of the present invention, resides in that the thixotropic fluid or the water-in-oil emulsion may be formed while the vehicles are moving over the sites where the vegetation is to be treated or eradicated, and the thixotropic fluid or emulsion is to be applied in the form of relatively large droplets which do not drift in moderate wind currents, and where a relatively large volume of liquid material is to be applied within a relatively short time. While we have shown and described two illustrative embodiments of this invention, it is understood that the concepts thereof may be employed in other embodiments without departing from the spirit and scope of this invention.

What is claimed is:
1. In a liquid mixing and distributing device, the combination comprising:
   a housing;
   a circular mixing chamber in said housing, which chamber includes liquid exhaust means at the top thereof and is inclosed at the bottom thereof;
   inlet means coupled to said chamber;
   shaft means positioned in said chamber and means rotatably mounting said shaft means;
   first impeller means on said shaft means and positioned adjacent at least one of said inlet means;
   second impeller means mounted on said shaft means above said first impeller means and having a pitch in the direction opposite to that of said first impeller means;
   third impeller means mounted above said second impeller means on said shaft means and having a pitch in the same direction as said first impeller means; and
   variable viscosity control means for automatically controlling the viscosity of the mixture in said chamber, said variable viscosity means including said first-mentioned impeller means and means for controlling the flow rate through one of said inlet means, said last-mentioned means being coupled to said first impeller means.

2. A liquid mixing and distributing device comprising:
   a housing;
   a cylindrical mixing chamber in said housing;
   inlet means coupled to said chamber;
   distributor means coupled to said housing below said mixing chamber;
   blade means rotatably mounted in said mixing chamber and including a first blade means positioned adjacent said inlet means for moving a liquid away from said inlet means, a second blade means positioned above said first blade means for moving a liquid in the direction opposite to the direction of liquid movement from said first blade means and third blade means positioned above said second blade means for moving a liquid in the same direction as said first blade means; and
   variable viscosity control means including fluid flow rate control means having valve means coupled to at least one of said inlet means and means coupling said valve means to said first blade means, said first blade means having a baffle edge, said means coupling said first blade means to said fluid flow rate control means including liquid baffle means adjacent the path of said first blade means and spring means biasing said valve means in a predetermined position.

3. In a mixing and distributing device, the combination comprising:
   a housing;
   a mixing chamber positioned in said housing;
   plural inlet means in said mixing chamber;
   blade means rotatably mounted in said chamber and including a first blade means positioned adjacent said inlet means, second blade means positioned remote from said first blade means and having a pitch in the direction opposite to said first blade means and third blade means positioned adjacent said second blade means and remote from said first blade means and having a pitch in the same direction as said first blade means;

distributor means in said housing remote from said mixing chamber for receiving the fluid mixed in said mixing chamber; and variable viscosity control means for controlling the viscosity of the fluid in said mixing chamber, said variable viscosity control means including valve means for controlling the effective cross-sectional area of one of said inlet means, said first blade means having a substantially straight edge, said valve means including baffle means positioned adjacent the path of said straight edge, spring means coupled to said housing and coupled to said valve means for controlling the position of said valve means and means for adjusting the spring tension on said spring means to thereby adjust the viscosity of the fluid mixed in said mixing chamber.

4. In a mixing and distributing device, the combination comprising:
a housing;
a cylindrical mixing chamber mounted in said housing;
plural inlet means in the bottom of said mixing chamber;
distributor means in said housing beneath said chamber;
blade means rotatably mounted in said chamber and including a first blade positioned adjacent said inlet means, a second blade positioned above said first blade and a third blade positioned above said second blade, one of said blades propelling the fluid in one axial direction, the other two of said blades propelling the fluid in the opposite axial direction; and
variable viscosity automatic control means including a valve plate positioned to control the effective cross-sectional area of one of said inlet means, fluid friction means coupling said valve plate to said first blade, spring means normally biasing said valve plate in a first direction and means for adjusting the tension of said spring means including a member on said housing movably mounted relative thereto.

5. In a mixing device, the combination comprising:
a fluid mixing chamber;
plural inlet means in the lower portion of said mixing chamber;
first impeller means adjacent said inlet means;
second impeller means positioned above said first impeller means;
third impeller means positioned above said second impeller means, one of said impeller means having a pitch in the opposite direction with respect to the other two of said impeller means; and
variable viscosity control means for controlling the viscosity of the fluid in said chamber by controlling the flow rate of fluid through one of said inlet means, said variable viscosity control means including valve means and fluid coupling means coupling said first impeller means to said valve means, the degree of coupling being proportional to the viscosity of the fluid in said chamber.

6. In a mixing device, the combination comprising:
a cylindrical mixing chamber having its axis substantially vertical;
inlet means in the lower portion of said mixing chamber;
first impeller means positioned in said chamber adjacent said inlet means;
second impeller means positioned in said chamber above said first impeller means and means for controlling the viscosity in said chamber by controlling the effective cross-sectional area of one of said inlet means, said control means including valve means operatively associated with one of said inlet means and means coupling said valve means to one of said impeller means and spring means normally biasing said valve means in one direction.

7. In a mixing device, the combination comprising:
a mixing chamber having a substantially circular cross-section and having its axis substantially vertical;
plural inlet means in the lower portion of said mixing chamber;
a first, a second and a third impeller rotatably mounted and axially aligned in that order within said mixing chamber, said first impeller being positioned adjacent at least one of said inlet means; and
automatic variable viscosity control means in said chamber including
valve means operatively associated with said first impeller and with one of said inlet means, and
bias means for normally maintaining said valve means in a predetermined position.

8. In a mixing device, the combination comprising:
a mixing chamber;
inlet means in the lower portion of said mixing chamber;
impeller means coupled to said mixing chamber for developing a force on a fluid in at least one direction;
means coupled to said impeller means for varying the effective cross-sectional area of said one inlet means to vary the flow rate through said one inlet means including baffle means positioned adjacent the path of fluid from said impeller means; and
means normally maintaining said effective cross-sectional area control means in a predetermined position.

9. In a liquid mixing and distributing device, the combination comprising:
a mixer housing;
a mixing chamber in said housing;
inlet means in the lower portion of said mixing chamber;
impeller means including a first impeller positioned adjacent said inlet means and having at least one baffle edge thereon;
distributor means coupled to said housing below said chamber and including
a centrifugal impeller positioned beneath said mixing chamber,
a pump housing having a plurality of discharge ports positioned adjacent the periphery of said centrifugal impeller through which fluid from said mixing chamber is dispersed,
means for varying the effective cross-sectional area of said discharge ports; and
variable viscosity control means including means for sensing the viscosity of the fluid in said mixing chamber and for controlling at least one of said inlet means.

10. In a liquid mixing and distributing device, the combination comprising:
a mixer housing;
a cylindrical mixing chamber in said housing;
plural inlet means in the lower portion of said mixing chamber;
a distributor in said mixer housing below said mixing chamber including a housing having a plurality of discharge ports and means for varying the effective cross-sectional area of said discharge ports; and
variable viscosity automatic control means including blade means and fluid friction means coupled to said blade means for varying the effective cross-sectional area of one of said plural inlet means in accordance with the viscosity of the fluid in said chamber.

11. A liquid mixing and distributing device comprising:
a housing;
a mixing chamber in said housing and having a cylindrical cross-section;
fluid circulating means coupled to said mixing chamber;
variable viscosity control means coupled to said mixing chamber and including said fluid circulating means;
plural inlet means in the lower portion of said mixing chamber; and
distributor means in said housing below said mixing chamber, said distributor means including
a centrifugal impeller,
a circular housing around said impeller having discharge ports circumferentially spaced therein and wherein said distributor means includes
means for controlling the effective cross-sectional area of said discharge ports, said last-mentioned means including
a plate juxtaposed said circular housing and having ports therein and
means for moving said plate relative to said circular housing.

12. In a mixing and distributing device, the combination comprising:
a housing;
a mixing chamber in said housing;
blade means rotatably mounted in said mixing chamber;
variable viscosity automatic control means for controlling the fluid viscosity in said mixing chamber;
plural inlet means in said mixing chamber; and
distributor means coupled to said housing below said said mixing chamber, said distributor means including
a centrifugal impeller,
a housing encircling said impeller and communicating with said mixer housing,
a plurality of discharge ports in said impeller housing adjacent the periphery of said impeller,
a plate rotatably mounted adjacent said impeller housing and having a plurality of apertures therein, gear means on said plate and a worm wheel in engagement with said gear means for rotating said plate relative to said impeller housing whereby the effective cross-sectional area of said discharge ports is varied to control the particle size of the liquid distributed through said discharge ports.

13. In a liquid mixing device, the combination comprising:
a housing;
a mixing chamber in said housing;
inlet means in the lower portion of said mixing chamber;
blade means rotatably mounted in said mixing chamber and including at least one blade rotatably mounted adjacent one of said inlet means;
variable viscosity automatic control means for controlling fluid viscosity in said mixing chamber including said one blade; and
means for adding fluid to said housing including a conduit coupled to one of said inlet means, extending around the periphery of said mixing chamber and having discharge means therein for distributing the additional fluid around said mixing chamber and within said housing.

14. In a liquid mixing device, the combination comprising:
a housing;
a cylindrical mixing chamber in said housing and including a bottom portion;
blade means rotatably mounted in said mixing chamber and including a first blade adjacent said bottom and a second blade intermediate said chamber, said blades being pitched in opposite directions;
automatic variable viscosity control means in said mixing chamber and including one of said blades;
inlet means in the bottom portion of said chamber; and
means for adding fluid to the housing around the periphery of said chamber including a conduit coupled to one of said inlet means and extending around said chamber and discharge means including a plurality of equally spaced apertures in said conduit and spaced around the periphery of the mixing chamber.

15. In a liquid mixing device, the combination comprising:
a housing;
a mixing receptacle in said housing;
a shaft rotatably mounted in said housing and extending through said mixing receptacle;
blade means secured to said shaft including a first blade positioned adjacent the bottom of said mixing receptacle and a second blade positioned intermediate said receptacle and having a pitch in the opposite direction to said first blade;
inlet means in the bottom of said receptacle;
automatic viscosity control means within said receptacle and including said first blade; and
baffle means positioned adjacent one of said inlet means and means coupled to said one inlet means for adding fluid to said housing around said receptacle.

16. In a liquid mixing device, the combination comprising:
a mixer housing;
a cylindrical mixing chamber in said housing;
a shaft rotatably mounted in said housing and extending through said mixing chamber;
a first blade on said shaft adjacent the bottom of said chamber, a second blade positioned on said shaft intermediate said chamber and a third blade secured to said shaft above said second blade;
automatic viscosity control means coupled to said chamber and including said first blade;
inlet means in the bottom of said chamber; and
means for adding fluid to said housing from one of said inlet means including means for controlling the amount of fluid added to said housing.

17. In a liquid mixing device, the combination comprising:
a housing;
a cylindrical mixing chamber in said housing;
a shaft rotatably mounted in said housing and extending through said mixing chamber;
a first blade on said shaft adjacent the bottom of said cylindrical chamber;
a second blade on said shaft intermediate said mixing chamber and having a pitch in the opposite direction from said first blade;
a third blade on said shaft above said second blade and having a pitch in the same direction as said first blade;
plural inlet means in the bottom of said chamber;
automatic viscosity control means in said chamber and including said first blade and means for effectively controlling the cross-sectional area of one of said inlet means;
means for adding fluid within said housing and exteriorly of said chamber; and
agitator means on said shaft beneath said mixing chamber for mixing the added fluid with the mixture from said mixing chamber.

18. In a liquid mixing and distributing device, the combination comprising:
a housing;
a mixing chamber in said housing;
blade means rotatably mounted adjacent the bottom of said mixing chamber;

automatic viscosity control means including said blade means;
inlet means in the bottom of said chamber;
means for adding fluid to the mixture from said chamber within said housing;
agitator means for mixing the fluid and said mixture; and
distributor means coupled to said housing for distributing liquid from said housing and including a plurality of discharge ports.

19. In a liquid mixing and distributing device, the combination comprising:
a housing;
a mixing chamber in said housing;
a shaft rotatably mounted in said housing and extending through said chamber;
a first, a second and a third blade secured to said shaft within said chamber;
an agitator secured to said shaft below said chamber;
means for adding liquid to the exterior of said chamber within said housing;
plural inlet means coupled to said mixing chamber;
means for controlling the amount of liquid supplied to said housing; and
distributor means coupled to said housing for distributing fluid from said housing including an impeller housing having a plurality of ports and a centrifugal impeller coupled to said shaft and positioned to direct fluid through said ports.

20. In a liquid mixing and distributing device, the combination comprising:
a mixer housing;
a mixing chamber in said housing;
plural inlet means coupled to the lower portion of said mixing chamber;
a plurality of blade means rotatably mounted in said chamber;
means coupled to one of said inlet means for controlling the effective cross-sectional area thereof, said last-mentioned means being coupled to one of said blade means;
means for adding liquid to the interior of said housing exteriorly of said chamber;
agitator means coupled to said blade means below said chamber for mixing the added liquid to the mixture from said chamber; and
distributor means coupled to said agitator means including an impeller housing having a plurality of peripheral ports and a centrifugal impelled in said housing.

21. In a liquid mixing and distributing device, the combination comprising:
a housing;
a mixing chamber in said housing;
plural liquid inlet means in the bottom of said mixing chamber;
a shaft rotatably mounted in said housing and extending through said chamber;
a first propeller rotatably mounted on said shaft adjacent the bottom of said chamber;
a second propeller on said shaft intermediate said chamber and having a pitch opposite to the direction of said first propeller;
variable viscosity control means including said first propeller and means for controlling the cross-sectional area of one of said liquid inlet means, said last-mentioned means including a valve plate rotatably mounted in said chamber adjacent one of said inlet means, resilient means for biasing said plate in a predetermined position and for opposing the rotation of said plate in the direction of rotation of said first propeller and baffle means on said plate adjacent the path of said first propeller, said plate having an aperture therein disposed adjacent said one inlet means for controlling the effective cross-sectional area of said one inlet means in response to the frictional force of the liquid between said first propeller and said baffle means.

22. A method for mixing an emulsion of predetermined viscosity including the steps of:
introducing a first and a second liquid through separate conduits into a mixing container;
agitating said liquids in said container with a moving surface; and
controlling the influx of one of said liquids in accordance with the frictional force of the mixture on said moving surface.

23. A method for mixing an emulsion of predetermined viscosity including the steps of:
introducing a first and a second liquid through separate conduits into a mixing container;
agitating said liquids in said container with a moving surface;
controlling the influx of one of said liquids in accordance with the frictional force of the mixture on said moving surface;
adding a liquid to said mixture after said mixture has passed out of said container; and
agitating said mixture and said liquid.

24. A method for mixing an emulsion of predetermined viscosity including the steps of:
introducing a first liquid into a mixing container and introducing a second liquid into the lower portion of said mixing container;
agitating said liquid in said container with a rotating surface; and
controlling the influx of said first liquid in accordance with the frictional force of the mixture between said surface and a baffle positioned adjacent the path of said surface.

25. A method for mixing an emulsion of predetermined viscosity including the steps of:
introducing a first liquid into a mixing container and introducing a second liquid into the lower portion of said mixing container;
agitating said liquids in said container with a rotating surface;
controlling the influx of said first liquid in accordance with the frictional force of the mixture between said surface and a baffle positioned adjacent the path of said surface;
adding a liquid to said mixture after said mixture has passed from said container; and
agitating said mixture and said liquid.

References Cited by the Examiner

UNITED STATES PATENTS 2,660,190  11/1953  Blondel _____ 259—8

FOREIGN PATENTS 420,931  12/1910  France.

IRVING BUNEVICH, *Primary Examiner.*
CHARLES A. WILLMUTH, *Examiner.*
ROBERT W. JENKINS, *Assistant Examiner.*